J. E. DE BISSCHOP.
WATER LEVEL REGULATOR.
APPLICATION FILED MAY 2, 1910.
980,214.
Patented Jan. 3, 1911.
3 SHEETS—SHEET 3.
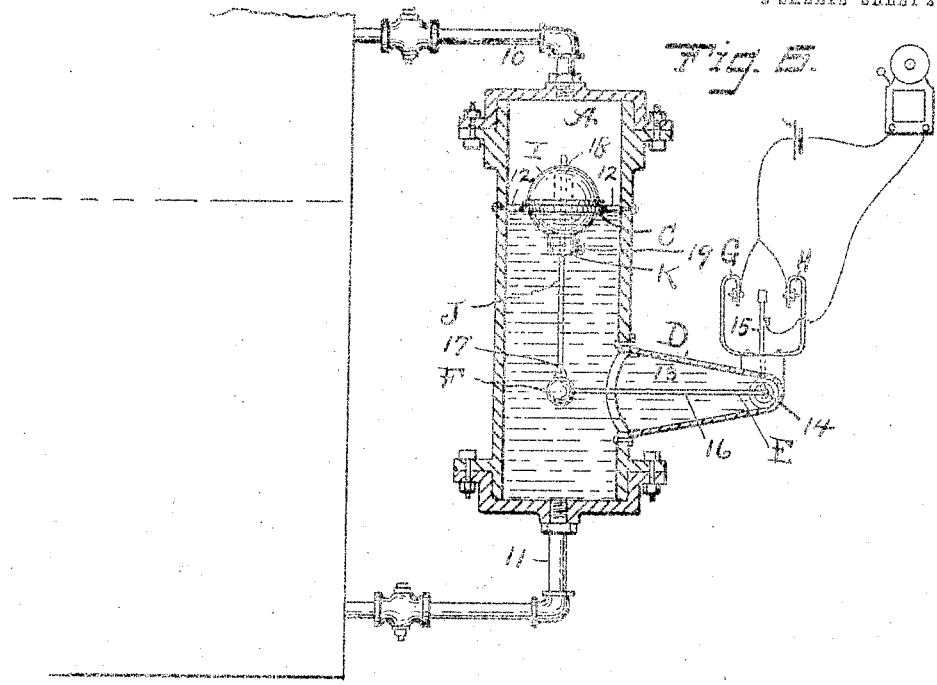
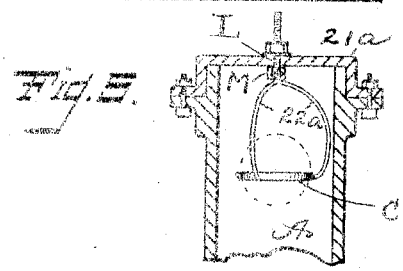
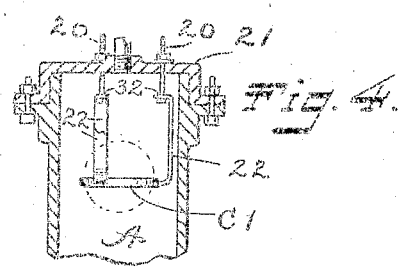
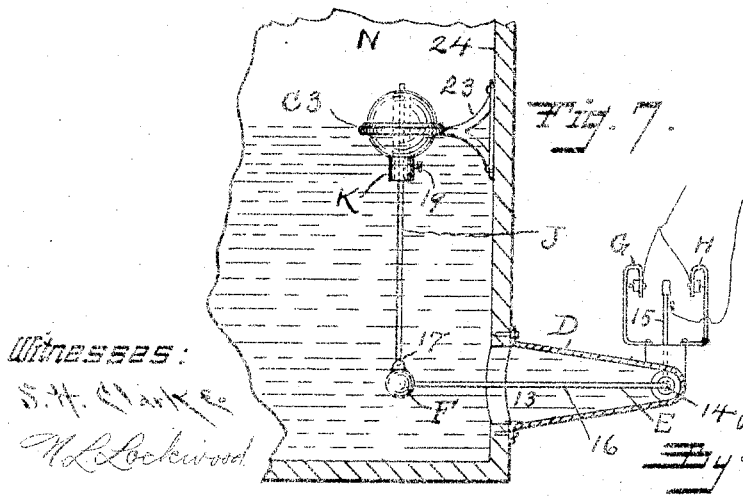
Witnesses:
Inventor
Joseph E. De Bisschop.
By Louis M. Schmidt
Atty.

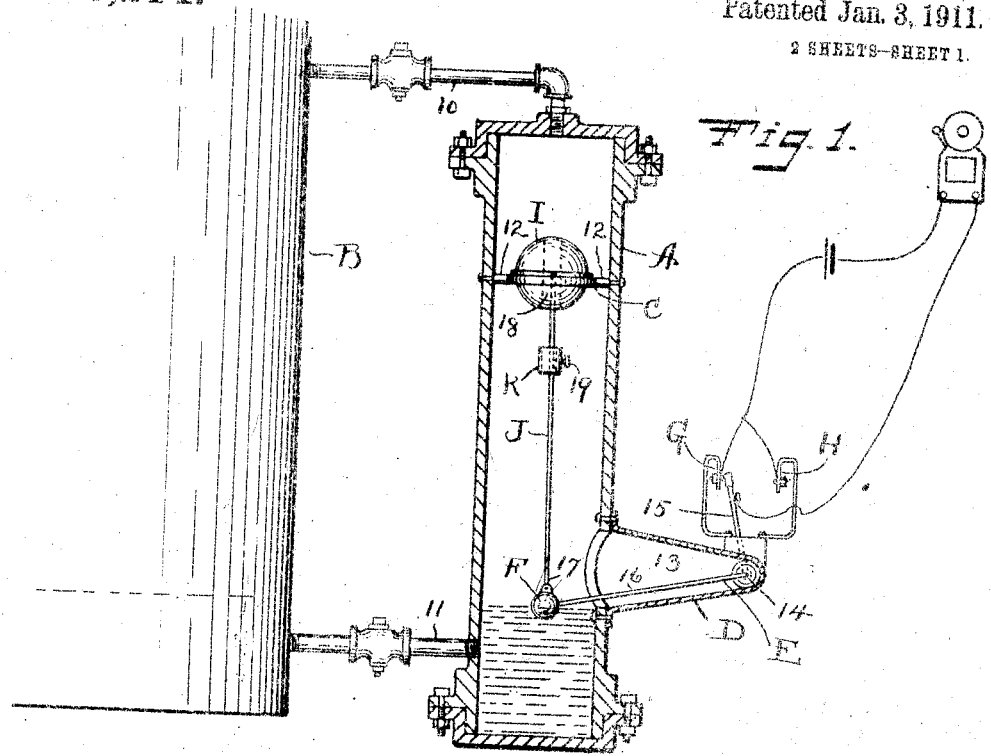
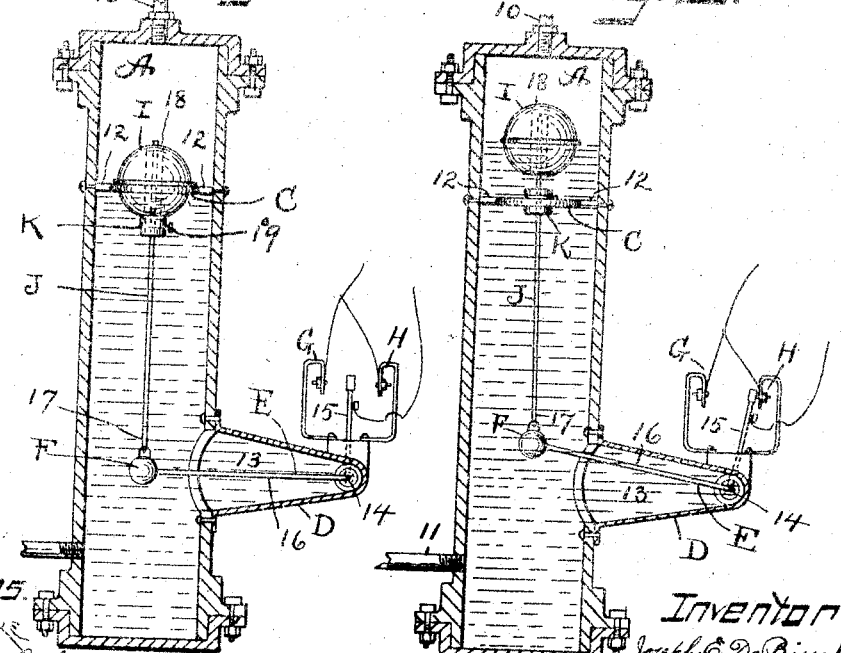

UNITED STATES PATENT OFFICE.

JOSEPH E. DE BISSCHOP, OF NEW BRITAIN, CONNECTICUT.

WATER-LEVEL REGULATOR.

980,214.   Specification of Letters Patent.   Patented Jan. 3, 1911.

Application filed May 2, 1910. Serial No. 558,964.

*To all whom it may concern:*

Be it known that I, JOSEPH E. DE BISSCHOP, a citizen of the United States, residing at New Britain, in the county of Hartford and State of Connecticut, have invented certain new and useful Improvements in Water-Level Regulators, of which the following is a specification.

My invention relates to improvements in water level regulators, and the objects of my improvements are simplicity and economy in construction and convenience and efficiency in use.

In the accompanying drawing: Figure 1 is a sectional view of my water level regulator as applied to a boiler, certain parts being shown in side elevation and electrical features diagrammatic, the parts being in the position for low water level indicating. Fig. 2 is a similar view of some of the parts shown in Fig. 1 in the position for high water level indicating. Fig. 3 is a similar view with the said parts in intermediate position. Fig. 4 is a view part sectional and part in elevation of a modification of the high level limiting ring. Fig. 5 is a similar view of another modification of the same. Fig. 6 is a view similar to that of Fig. 1 of my alarm with the range of action limited to the ordinary range for a boiler. Fig. 7 is a view similar to Fig. 1 of my alarm applied to a water tank.

A is a chamber generally cylindrical and having its upper and lower ends connected by piping with a boiler B, the water level in which it is desired to regulate, the upper connection 10 being connected above the desired water level and the lower connection 11 below said level. In the upper part of the said chamber A, and approximately central thereof and approximately at the higher water level is provided a horizontally disposed supporting ring C shown as supported by lateral supports 12. At a point approximately at the lower water level the said chamber A is provided with a laterally disposed arm D constituting a lateral extension 13 of the said chamber A in which is housed a lever arm 16, generally horizontally disposed within the said chamber. The said lever arm 16 is extended outside the said chamber A by means of a horizontal shaft 14 at its outer end and which extends at right angles to the said arm 16 and through a stuffing box in the side of the said extension D and is provided on the outside with an upwardly extending branch arm 15, which latter is utilized as an electrical contact arm. The laterally disposed lever arm 16 and vertically disposed lever arm 15 are united by the said horizontal shaft 14 and pivotally supported thereby, and unite to compose a rocker arm E. The inner end of the said laterally disposed lever arm 16 is provided with a lower float ball F of moderate floating capacity, and which is adapted to rise and lower with changes in water level and thereby move the said rocker arm E so as to make electrical contact in accordance with predetermined adjustment, to indicate high or low water level. As shown contact will be made by the contact arm 15 with the mating contact G at the condition of low water, and at H for high water. The utilization of such contacts for producing an alarm may be effected by ordinary methods, as, for instance, by means of a battery and bell or gong. The said contacts may also be utilized by well known methods for the automatic starting and stopping of pumping devices for the purpose of automatic maintenance of water level. The location of the said lower float ball F is generally directly below the said supporting ring C.

A thrust rod J is pivoted by its lower end 17 to the upper side of the said lower float ball F and extends generally vertically and upward therefrom through the said supporting ring C and through an axial passage way 18 in an upper float ball I and is adapted to reciprocate in the said passage way with the rise and fall of the said lower float ball F relatively to the said upper float ball I. The upper end of the said thrust rod J is guided by the said passage way 18 when the said upper float ball I is resting on and supported by the said supporting ring C during conditions of normal or low water level and serves to guide the said upper float ball I with reference to the said supporting ring C when the said upper float ball I is floating above the said ring C during normal conditions of high water level. A stop K adjustably mounted on the said thrust rod J as by means of a set screw 19 engages with the under side of the said upper float ball I and limits the closeness of the said lower float ball F and upper float ball I.

In Fig. 4 is shown a supporting ring C¹ held in place by means of curved elbow connections 22 which are connected by bolts 20 with the upper head 21 of the said chamber A. A swivel connection 32 of the said bolt 20 and elbow connections 22 permits of turning the said bolt 20 so as to provide means of adjustment of the elevation of the said supporting ring C¹.

In Fig. 5 the supporting ring C² is supported by means of a pivotal suspension support comprising a single central vertical rod L adjustably supported in the head 21ª and connected at its lower end by a ball and socket swivel joint M with a set of curved elbow connections 22ª.

In the tank N the supporting ring C³ is supported by a bracket 23 to the side wall 24 of the tank.

The fixed electrical contacts G and H may be made adjustable by ordinary methods.

In operation, under normal conditions of water level the said lower float ball will be submerged and tend to rise and will be limited in such tendency by the said stop K in contact with the lower side of the said upper float ball I and the weight of the said upper float ball, which rests on the said supporting ring C, and the contact arm 15 is intermediate the said fixed contact points G and H. As the water level rises due to inflow of a supply of water a condition of level is reached at which the said upper float ball I is lifted from the supporting ring C, permitting the lower float F to rise by its buoyancy until the contact arm 15 makes contact with the fixed high water contact H. As the water level lowers, the upper ball I is seated on the ring C and as the level continues to fall a point is reached at which the lower ball F is no longer submerged and responds to a further fall in the level so as to bring the movable contact arm 15 finally into contact with the fixed contact G corresponding to the predetermined point of low water level.

I claim as my invention:

1. In a water level regulator, a contact arm pivotally mounted and provided with a float ball, the said float ball free to respond to low water conditions, restraining means operative to limit the movement of said ball during normal conditions of water level, and the said restraining means being released and inoperative during high water conditions, the said restraining means comprising a second float ball that is operative during such high water conditions.

2. In a water level regulator, a contact arm pivotally mounted and provided with a lower float ball, the said ball free to respond to low water conditions and a higher float ball having a ring support, a thrust rod attached to said lower ball and extending upwardly therefrom through said upper ball, the said upper ball resting on said ring during normal and low water conditions, a stop on said rod in contact with said upper ball during normal water conditions and restraining said lower ball during such conditions.

3. In a water level regulator, a lower float ball and an upper float ball, a thrust rod attached to said lower float ball and extending upwardly through said upper ball, a stop on said rod, a ring support for said upper ball, the said upper ball resting on said ring during normal and low water conditions, the said lower ball free to fall in response to low water conditions, restrained from rising during normal water conditions by said stop in contact with said upper ball, and the said upper ball free to rise during high water conditions and permit a rise of said lower ball during such conditions.

4. In a water level regulator, a contact arm pivotally mounted and provided with a lateral extension, a lower float ball secured to the said extension and generally free to respond to low water conditions, a thrust rod secured to the upper side of the said lower float and extending upwardly therefrom, a stop on said rod, an upper float ball, an axial passageway through said ball, fitting said rod, and permitting freely reciprocating motion of the same, a supporting ring surrounding the said rod and adapted to receive the said upper float ball and support the same during normal and low water conditions, and the said stop in contact with the said upper float ball and adapted thereby to limit the rise of said lower float ball during such condition.

5. In a water regulator, in combination, a lower float ball and an upper float ball, an opening through the said upper float ball, a rod extending upwardly from the said lower ball, through said opening in the said upper float ball and fitting the same, a stop on the said rod, means of support for said upper float ball operative during normal and low water conditions, the said lower float ball free to fall responsive to low water conditions, and limited in its upward movement during normal conditions by the said stop in contact with the said upper float ball.

JOSEPH E. DE BISSCHOP.

Witnesses:
SHEFFIELD H. CLARKE,
NEWTON L. LOCKWOOD.